(12) United States Patent
Noh et al.

(10) Patent No.: US 9,429,215 B2
(45) Date of Patent: Aug. 30, 2016

(54) MULTI-STAGE AUTO TRANSMISSION FOR VEHICLE

(71) Applicants: Myeong-Hoon Noh, Whasung-Si (KR);
Jae-Chang Kook, Whasung-Si (KR);
Won-Min Cho, Whasung-Si (KR);
Seong-Wook Ji, Whasung-Si (KR);
Kang-Soo Seo, Whasung-Si (KR);
Seong-Wook Hwang, Whasung-Si (KR)

(72) Inventors: Myeong-Hoon Noh, Whasung-Si (KR);
Jae-Chang Kook, Whasung-Si (KR);
Won-Min Cho, Whasung-Si (KR);
Seong-Wook Ji, Whasung-Si (KR);
Kang-Soo Seo, Whasung-Si (KR);
Seong-Wook Hwang, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 4 days.

(21) Appl. No.: 14/565,232

(22) Filed: Dec. 9, 2014

(65) Prior Publication Data

US 2016/0091058 A1 Mar. 31, 2016

(30) Foreign Application Priority Data

Sep. 26, 2014 (KR) .................. 10-2014-0129195

(51) Int. Cl.
*F16H 3/66* (2006.01)
(52) U.S. Cl.
CPC .............. *F16H 3/66* (2013.01); *F16H 3/666* (2013.01); *F16H 2200/0069* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

2012/0135834 A1* 5/2012 Gumpoltsberger ....... F16H 3/36
475/276

FOREIGN PATENT DOCUMENTS

| JP | 5373735 B2 | 9/2013 |
|---|---|---|
| KR | 10-0931050 B1 | 12/2009 |
| KR | 10-2012-0062720 A | 6/2012 |
| KR | 10-1360415 B1 | 2/2014 |

* cited by examiner

*Primary Examiner* — Colby M Hansen
(74) *Attorney, Agent, or Firm* — Morgan, Lewis & Bockius LLP

(57) ABSTRACT

A multi-stage auto transmission for a vehicle may include first, second, third and fourth planetary gear sets each including first, second and third rotating elements, friction members including first, second and third clutches and first, second and third brakes, an input shaft to which rotation power is inputted, and an output shaft from which the rotation power is outputted. By selectively or continuously connecting the rotating elements of the planetary gear sets to the input shaft, the output shaft or each other, the multi-stage auto transmission implements ten forward speeds and one reverse speed.

9 Claims, 25 Drawing Sheets

FIG.2

|      | C1 | C2 | C3 | B1 | B2 | B3 | GEAR RATIO |
|------|----|----|----|----|----|----|------------|
| 1ST  | ●  | ●  |    |    | ●  |    | 4.636      |
| 2ND  |    | ●  |    | ●  | ●  |    | 3.103      |
| 3RD  |    | ●  |    |    | ●  | ●  | 2.359      |
| 4TH  |    | ●  |    | ●  |    | ●  | 1.734      |
| 5TH  | ●  | ●  |    |    |    | ●  | 1.357      |
| 6TH  | ●  | ●  | ●  |    |    |    | 1.000      |
| 7TH  |    | ●  | ●  |    |    | ●  | 0.851      |
| 8TH  | ●  |    | ●  |    |    | ●  | 0.750      |
| 9TH  |    |    | ●  | ●  |    | ●  | 0.719      |
| 10TH |    |    | ●  |    | ●  | ●  | 0.625      |
| Rev  | ●  |    |    |    | ●  | ●  | -2.250     |

MULTI-STAGE AUTO TRANSMISSION FOR VEHICLE

CROSS-REFERENCE TO RELATED APPLICATIONS

The present application claims priority of Korean Patent Application Number 10-2014-0129195 filed on Sep. 26, 2014, the entire contents of which are incorporated herein for all purposes by this reference.

BACKGROUND OF THE INVENTION

1. Field of the Invention

The present invention relates to a multi-stage auto transmission for a vehicle, and more particularly, to a multi-stage auto transmission for a vehicle, which includes a gear train capable of implementing a ten-forward and one-reverse speed transmission through the same components as those in a nine-forward and one-reverse speed transmission.

2. Description of Related Art

Recently, the reinforcement of environment regulations or the increase of oil price has further required the improvement of fuel efficiency. Thus, much attention has been paid to the development of technology for improving performance in the powertrain field.

In response to the attention, a powertrain technology has been developed. The powertrain technology includes an engine downsizing technology and a multi-staging technology for an auto transmission. The engine downsizing technology has an advantage in that it can reduce the weight of a vehicle and improve fuel efficiency, and the multi-staging technology has an advantage in that it can secure operability and competitiveness in fuel efficiency. Specifically, the multi-staging technology can design an excellent transmission gear ratio in terms of power performance and fuel efficiency, using a larger number of gear shifts than a four-forward (or five-forward) and one-reverse auto transmission.

Examples of the multi-stage auto transmission include an eight-forward and one-reverse speed auto transmission implemented with a combination of three sets of planetary gears and six friction elements and a nine-forward and one-reverse speed auto transmission implemented with a combination of four sets of planetary gears, four friction elements, and two dog clutches.

In an auto transmission, however, gear shifts are implemented with a gear train to which planetary gear sets are applied. Thus, as the number of gear shifts is increased, the number of parts forming the auto transmission is also increased. Thus, in the multi-staging technology of the auto transmission, it is important to secure operability and competitiveness in fuel efficiency through a gear train structure which does not increase the number of internal parts. The increase in number of internal parts may degrade the mounting efficiency, price, weight, and power transmission efficiency of the vehicle.

Thus, an optimal structure of a gear train, which is capable of securing the maximum efficiency using a small number of parts, must be applied to develop a ten-forward and one-reverse speed auto transmission for increasing the fuel efficiency improvement effect through a larger number of gear shifts than an eight-forward and one-reverse speed auto transmission or a nine-forward and one-reverse speed auto transmission.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

The present invention is directed to a multi-stage auto transmission for a vehicle, which is capable of implementing ten forward speeds and one reverse speed through a gear train using four planetary gear sets, three clutches, and three brakes such that the vehicle can be smoothly operated because an operation point in a low RPM range is used, and particularly, to a multi-stage auto transmission for a vehicle, which includes a gear train implemented with the same components as those of a gear train included in a nine-forward and one-reverse speed auto transmission, thereby further improving fuel efficiency than the nine-forward and one-reverse speed auto transmission.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with various aspects of the present invention, a multi-stage auto transmission for a vehicle may include: first, second, third and fourth planetary gear sets each comprising first, second and third rotating elements; friction members comprising first, second and third clutches and first, second and third brakes; an input shaft to which rotation power is inputted; and an output shaft from which the rotation power is outputted, wherein the first rotating element of the first planetary gear set is selectively connected to the input shaft through the first clutch and permanently connected to the first rotating element of the second planetary gear set in a state where the first rotating element of the first planetary gear set is fixed by the first brake, the second rotating element of the first planetary gear set is variably connected to the second rotating element of the second planetary gear set through the third clutch in a state where the second rotating element of the first planetary gear set is fixed by the second brake, and the third rotating element of the first planetary gear set is permanently connected to the second rotating element of the fourth planetary gear set, the first rotating element of the second planetary gear set is permanently connected to the first rotating element of the first planetary gear set, the second rotating element of the second planetary gear set is variably connected to the third rotating element of the third planetary gear set through the second clutch, and the third rotating element of the second planetary gear set is permanently connected to the input shaft, the first rotating element of the third planetary gear set is permanently connected to the first rotating element of the fourth planetary gear set and fixed by the third brake, the second rotating element of the third planetary gear set is permanently connected to the third rotating element of the fourth planetary gear set and permanently connected to the output shaft, and the third rotating element of the third planetary gear set is variably connected to the second rotating element of the second planetary gear set through the second clutch, and the first rotating element of the fourth planetary gear set is permanently connected to the first rotating element of the third planetary gear set and fixed by the third brake, the third rotating element of the fourth planetary gear set is permanently connected to the third rotating element of the first planetary gear set, and the third rotating element of the fourth planetary gear set is permanently connected to the second rotating element of the third planetary gear set.

In accordance with various other aspects of the present invention, a multi-stage auto transmission for a vehicle may include: a first planetary gear set comprising first, second and third rotating elements and having a first clutch and first and second brakes arranged at a front thereof; a second planetary gear set comprising first, second and third rotating elements and having second and third clutches arranged at a front thereof; a third planetary gear set comprising first, second and third rotating elements; a fourth planetary gear set comprising first, second and third rotating elements and having a third brake arranged at a rear thereof; an input shaft selectively connected to the first rotating element of the first planetary gear set through the first clutch, and directly connected to the second rotating element of the second planetary gear set; and an output shaft connected to the third rotating element of the fourth planetary gear set and the second rotating element of the third planetary gear set.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a table showing operating elements of friction members applied to a gear train for each gear shift in an exemplary multi-stage auto transmission for a vehicle in accordance with the present invention.

DESCRIPTION OF SPECIFIC EMBODIMENTS

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
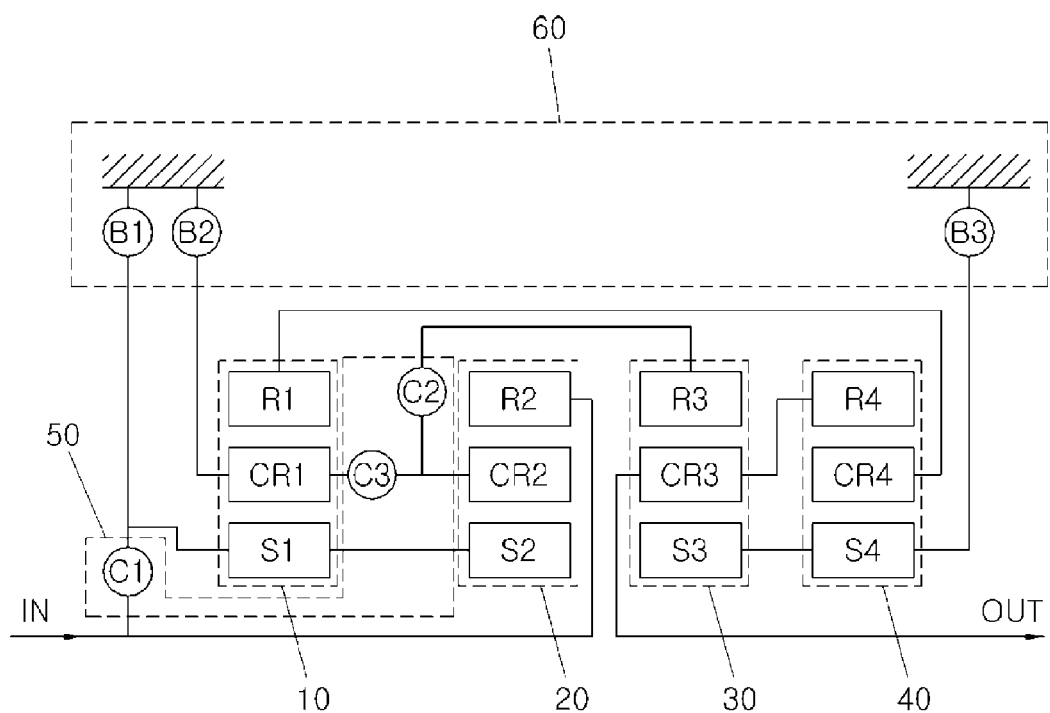
FIG. 1 illustrates a structure of a gear train of an exemplary multi-stage auto transmission for a vehicle in accordance with the present invention.

FIG. 1 illustrates the structure of a gear train of a multi-stage auto transmission for a vehicle in accordance with various embodiments of the present invention. As illustrated in FIG. 1, the gear train may receive an input through an input shaft IN serving as an input member, and transmit an output through an output shaft OUT serving as an output member. The input shaft IN may include a turbine shaft of a torque converter, through which rotation power from an engine crank shaft is inputted while converted into a torque through the torque converter. The output shaft OUT may be connected to a differential gear or a publicly known differential gear which drives wheels.

For this structure, the gear train may include four planetary gear sets 10, 20, 30 and 40 arranged on the same axial line, a clutch set 50 including first to third clutches C1 to C3, and a brake set 60 including first to third brakes B1 to B3, and implement ten forward speeds and one reverse speed through selective operations of the four planetary gears and the six friction members. In particular, the four planetary gear sets 10, 20, 30 and 40 may be divided into a first complex planetary gear device including the first and second planetary gear sets 10 and 20 and a second complex planetary gear device including the third and fourth planetary gear sets 30 and 40. The first and second complex planetary gear devices may be connected through one or more permanent connection paths.

Specifically, in some embodiments, a first rotating element of first to third rotating elements of the first planetary gear set 10 may be selectively connected to the input shaft IN through the first clutch C1, fixed by the first brake B1, and continuously connected to the second rotating element of the second planetary gear set 20. The second rotating element of the first to third rotating elements of the first planetary gear set 10 may be fixed by the second brake B2, and selectively connected to the second rotating element of the second planetary gear set 20 through the third clutch C3. The third rotating element of the first to third rotating elements of the first planetary gear set 10 may be continuously connected to a second rotating element of the fourth planetary gear set 40. The second rotating element of the first to third rotating elements of the second planetary gear set 20 may be continuously connected to a third rotating element of the third planetary gear set 30 through the second clutch C2. The third rotating element of the first to third rotating elements of the second planetary gear set 20 may be continuously connected to the input shaft IN. The first rotating element of the first to third rotating elements of the third planetary gear set 30 may be continuously connected to the first rotating element of the fourth planetary gear set 40, and fixed to the third brake B3. The second rotating element of the first to third rotating elements of the third planetary gear set 30 may be continuously connected to the first rotating element of the fourth planetary gear set 40, and continuously connected to the output shaft.

Thus, each of the first to fourth planetary gear sets 10, 20, 30 and 40 may include three rotating elements, that is, the first to third rotating elements.

For example, among the first to third rotating elements of the first planetary gear set 10, the first rotating element is a first sun gear S1, the second rotating element is a first carrier CR1, and the third rotating element is a first ring gear R1. Among the first to third rotating elements of the second planetary gear set 20, the first rotating element is a second sun gear S2, the second rotating element is a second carrier CR2, and the third rotating element is a second ring gear R2. Among the first to third rotating elements of the second planetary gear set 30, the first rotating element is a third sun gear S3, the second rotating element is a third carrier CR3, and the third rotating element is a third ring gear R3. Among the first to third rotating elements of the fourth planetary gear set 40, the first rotating element is a fourth sun gear S4, the second rotating element is a fourth carrier CR4, and the third rotating element is a fourth ring gear R4.

Then, the first sun gear S1 may be selectively connected to the input shaft IN through the first clutch C1, fixed by the first brake B1, and continuously connected to the second sun gear S2. The first carrier CR1 may be fixed by the second brake B2, and selectively connected to the second carrier CR2 through the third clutch C3. The first ring gear R1 may be continuously connected to the fourth carrier CR4. Thus, the permanent connection path between the first complex planetary gear device including the first and second planetary gear sets 10 and 20 and the second complex planetary gear device including the third and fourth planetary gear sets 30 and 40 may be formed through the ring gear R1 and the fourth carrier CR4.

The second sun gear S2 may be continuously connected to the first sun gear S1. The second carrier CR2 may be selectively connected to the third ring gear R3 through the second clutch C2. The second ring gear R2 may be continuously connected to the input shaft IN.

The third sun gear S3 may be continuously connected to the fourth sun gear S4, and fixed by the third brake B3. The third carrier CR3 may be continuously connected to the fourth ring gear R4, and continuously connected to the output shaft OUT. The third ring gear R3 may be selectively connected to the second carrier CR2 through the second clutch C2. Thus, the third carrier CR3/the fourth ring gear R4 may serve as an output element of the gear train.

The fourth sun gear S4 may be continuously connected to the third sun gear S3, and fixed by the third brake B3. The fourth carrier CR4 may be continuously connected to the first ring gear R1. The fourth ring gear R4 may be continuously connected to the third carrier CR3. Thus, the fourth ring gear R4/the third carrier CR3 may serve as an output element of the gear train.

Furthermore, the first to third clutches C1 to C3 and the first to third brakes B1 to B3 forming six friction members may be implemented with multiple-plate hydraulic friction coupling units which are frictionally coupled through a typical hydraulic method. In particular, the first clutch C1 and the first and second brakes B1 and B2 may be arranged at the front of the first planetary gear set 10, the second and third clutches C2 and C3 may be arranged between the rear of the first planetary gear set 10 and the front of the second planetary gear set 20, and the third brake B3 may be arranged at the rear of the fourth planetary gear set 40. When such an arrangement is applied, a path for hydraulic pressure supplied to the friction members may be easily formed, and the weight may be uniformly distributed to improve the weight balance of the entire auto transmission.

Specifically, in some embodiments, the first brake B1 may fix the first sun gear S1, the second brake B2 may fix the first carrier CR1, and the third brake B3 may fix the fourth sun gear S4 which is continuously connected to the third sun gear S3. The first clutch C1 may selectively connect the input shaft IN and the first sun gear S1, the second clutch C2 may selectively connect the second carrier CR2 and the third ring gear R3, and the third clutch C3 may selectively connect the first carrier CR1 and the second carrier CR2.

FIG. 2 shows operating elements of the friction members applied to the gear train for each gear shift in the multi-stage auto transmission in accordance with various embodiments of the present invention. As shown in FIG. 2, the gear train may perform sequential gear shift using three friction members at each gear shift, while releasing one gear shift and holding another gear shift. Specifically, at the forward first speed, the first and second clutches C1 and C2 and the second brake B2 may be operated for gear shifting. At the forward second speed, the second clutch C2 and the first and second brakes B1 and B2 may be operated for gear shifting. At the forward third speed, the second clutch C2 and the second and third brakes B2 and B3 may be operated for gear shifting. At the forward fourth speed, the second clutch C2 and the first and third brakes B1 and B3 may be operated for gear shifting. At the forward fifth speed, the first and second clutches C1 and C2 and the third brake B3 may be operated for gear shifting. At the forward sixth speed, the first to third clutches C1 to C3 may be operated for gear shifting. At the forward seventh speed, the second and third clutches C2 and C3 and the third brake B3 may be operated for gear shifting. At the forward eighth speed, the first and third clutches C1 and C3 and the third brake B3 may be operated for gear shifting. At the forward ninth speed, the third clutch C3 and the first and third brakes B1 and B3 may be operated for gear shifting. At the forward tenth speed, the third clutch C3 and the second and third brakes B2 and B3 may be operated for gear shifting. At the reverse speed, the first clutch C1 and the second and third brakes B2 and B3 may be operated for gear shifting.

As such, since three operating elements are coupled to implement each gear shift, the number of fiction elements which are not operated may be decreased to reduce a friction drag loss. Thus, the power transmission efficiency of the auto transmission may be improved to ultimately contribute to improving the fuel efficiency of the vehicle.

One would appreciate that the numbers shown in FIG. 2 and other figures are exemplary and non-limiting.

FIG. 3 to FIG. 22 illustrate gear shift patterns for the forward first to tenth speeds and the reverse speed of the gear train in accordance with various embodiments of the present invention. In each of the illustrated gear shift patterns, a horizontal dotted line indicates a connection state, a horizontal central line indicates a rotation speed of "0", and horizontal upper and lower lines indicate a rotation speed of "1.0" which corresponds to the same rotation speed as the input shaft IN. Furthermore, vertical lines are sequentially set to indicate or represent the first ring gear R1, the first carrier CR1, the first sun gear S1, the second sun gear S2, the second carrier CR2, the second ring gear R2, the third/fourth sun gear S34, the fourth carrier CR4, the third carrier/the fourth ring gear CR3/R4, the first carrier CR1, the first sun gear S1, and the third ring gear R3 from the left side, and an interval between the respective elements may be determined according to the gear ratios of the first to fourth planetary gear sets 10, 20, 30 and 40. The gear ratio indicates the ratio of the teeth number of a sun gear to the teeth number of a ring gear. Furthermore, an input may be transmitted to the first and second planetary gear sets 10 and 20 forming the first complex planetary gear device, and an output may be transmitted through the third carrier/the third ring gear CR3/R4 of the third and fourth planetary gear sets 30 and 40 forming the second complex planetary gear device. In such a gear shift pattern, the position settings of the respective rotating elements can be easily understood by those skilled in the art. Thus, the detailed descriptions thereof are omitted herein.

Figure 3:
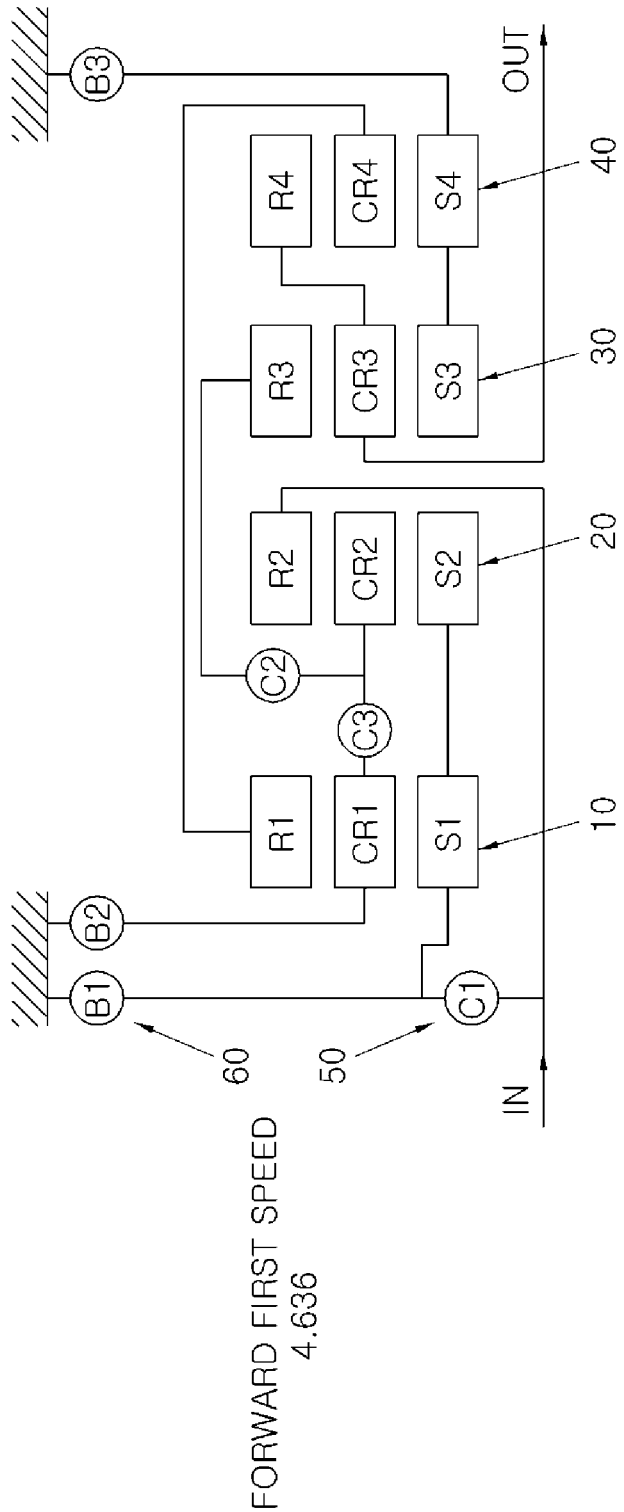
FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, and FIG. 22 illustrate gear shift patterns for forward first to tenth speeds of a gear train of an exemplary multi-stage auto transmission for a vehicle in accordance with the present invention.
Figure 4:
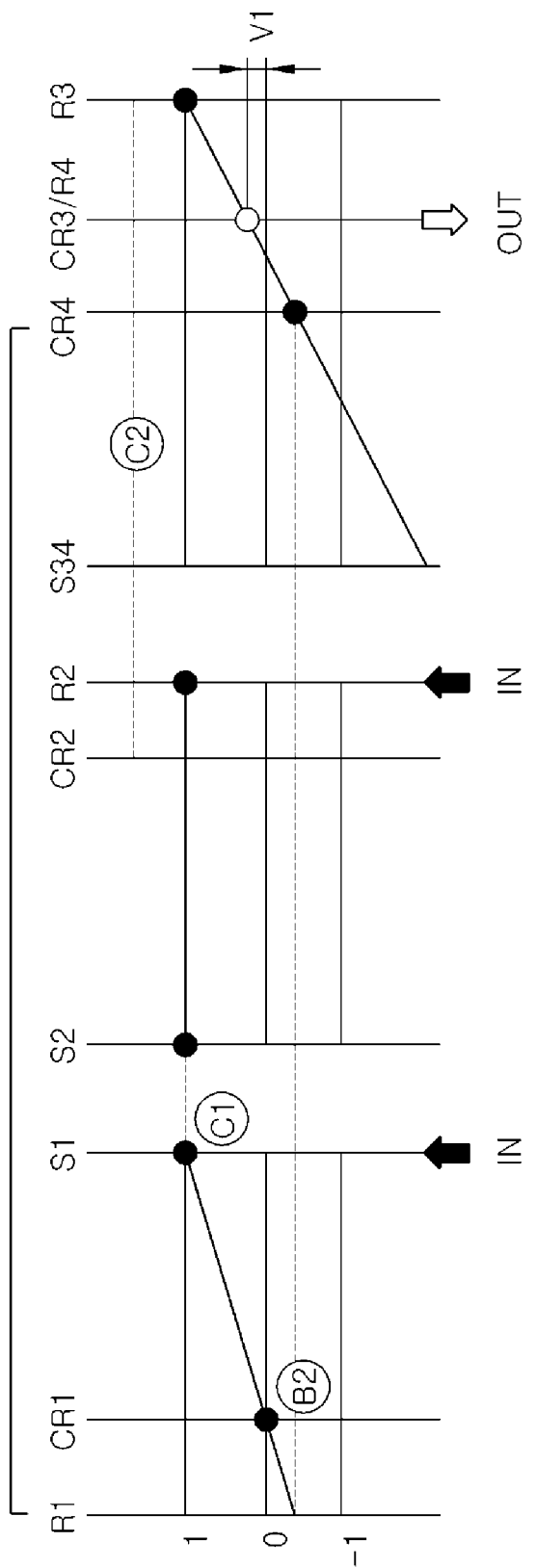

At the forward first speed of FIG. 3 and FIG. 4, the operations of the first and second clutches C1 and C2 and the second brake B2 may be controlled. Then, the operation of the first clutch C1 may connect the input shaft IN to the first sun gear S1, the operation of the second clutch C2 may connect the second carrier CR2 to the third ring gear R3, and the operation of the second brake B2 may fix the first carrier CR1. Thus, the input of the input shaft IN may be transmitted to the first sun gear S1 and the second ring gear R2 of the first and second planetary gear sets 10 and 20. Then, as a speed line is formed by a complementary operation between the rotating elements, the third carrier/fourth ring gear CR3/R4 of the third and fourth planetary gear sets 30 and 40 may generate a forward first speed output by V1 of the horizontal upper line. The first speed output of the third carrier/fourth ring gear CR3/R4 may be transmitted to the differential gear device through the output shaft OUT, and the gear shifting for the forward first speed may be completed.

Figure 5:
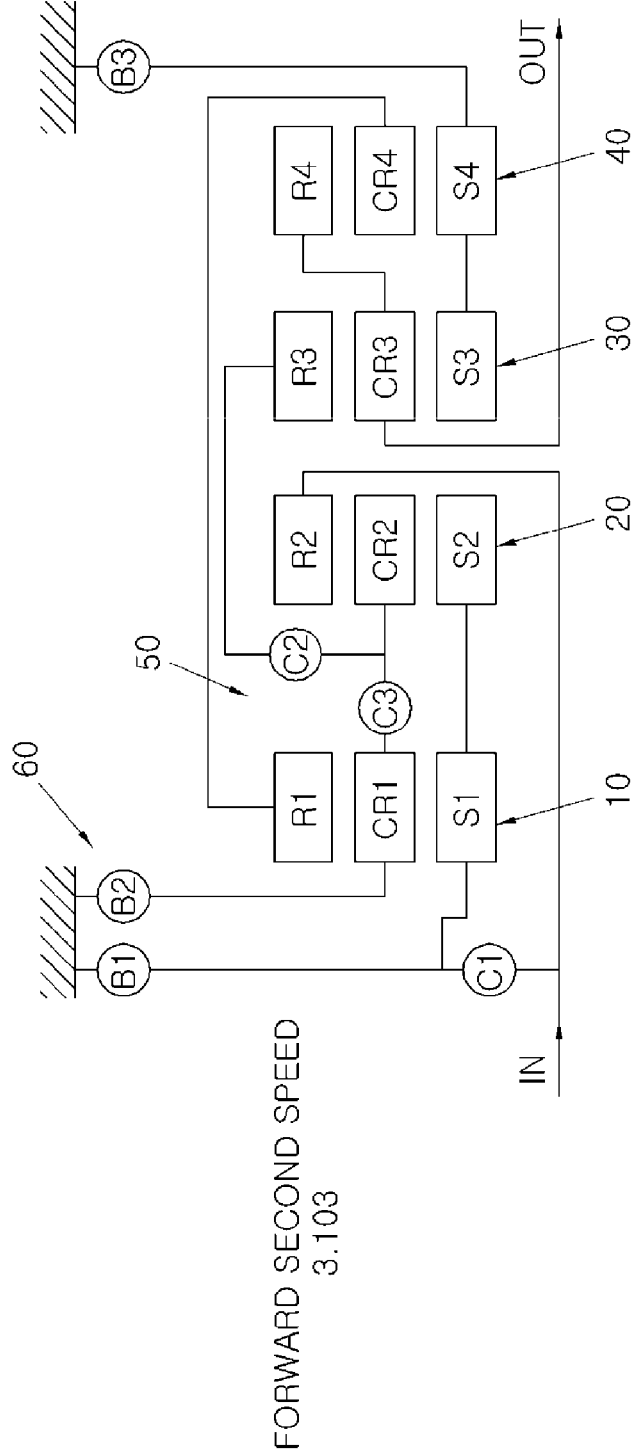
Figure 6:
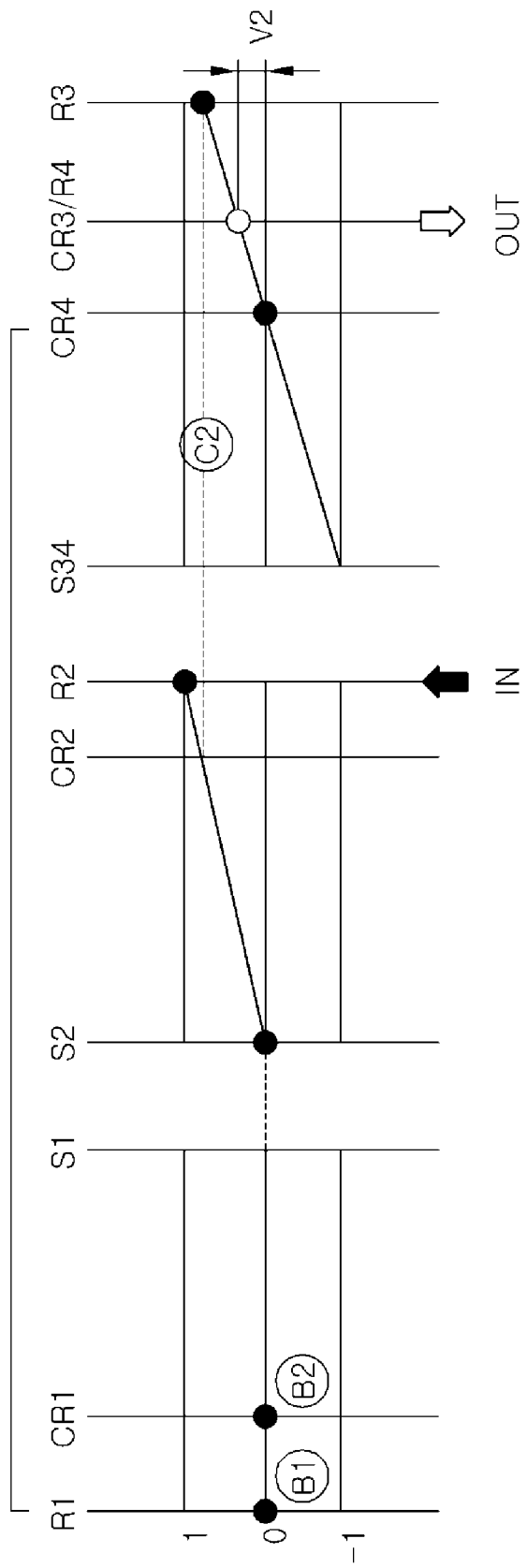

At the forward second speed of FIG. 5 and FIG. 6, the release of the first clutch C1 and the operation of the first brake B1 may be performed in the state of the forward first speed, in order to control the operations of the second clutch C2 and the first and second brakes B1 and B2. Then, the release of the first clutch C1 may disconnect the input shaft IN from the first sun gear S1, and the operation of the first brake B1 may fix the first ring gear R1. Thus, as a speed line is formed by a complementary operation between the rotating elements, the third carrier/fourth ring gear CR3/R4 of the third and fourth planetary gear sets 30 and 40 may generate a forward second speed output by V2 of the horizontal upper line. The second speed output of the third carrier/fourth ring gear CR3/R4 may be transmitted to the differential gear through the output shaft OUT, and the gear shifting for the forward second speed may be completed.

Figure 7:
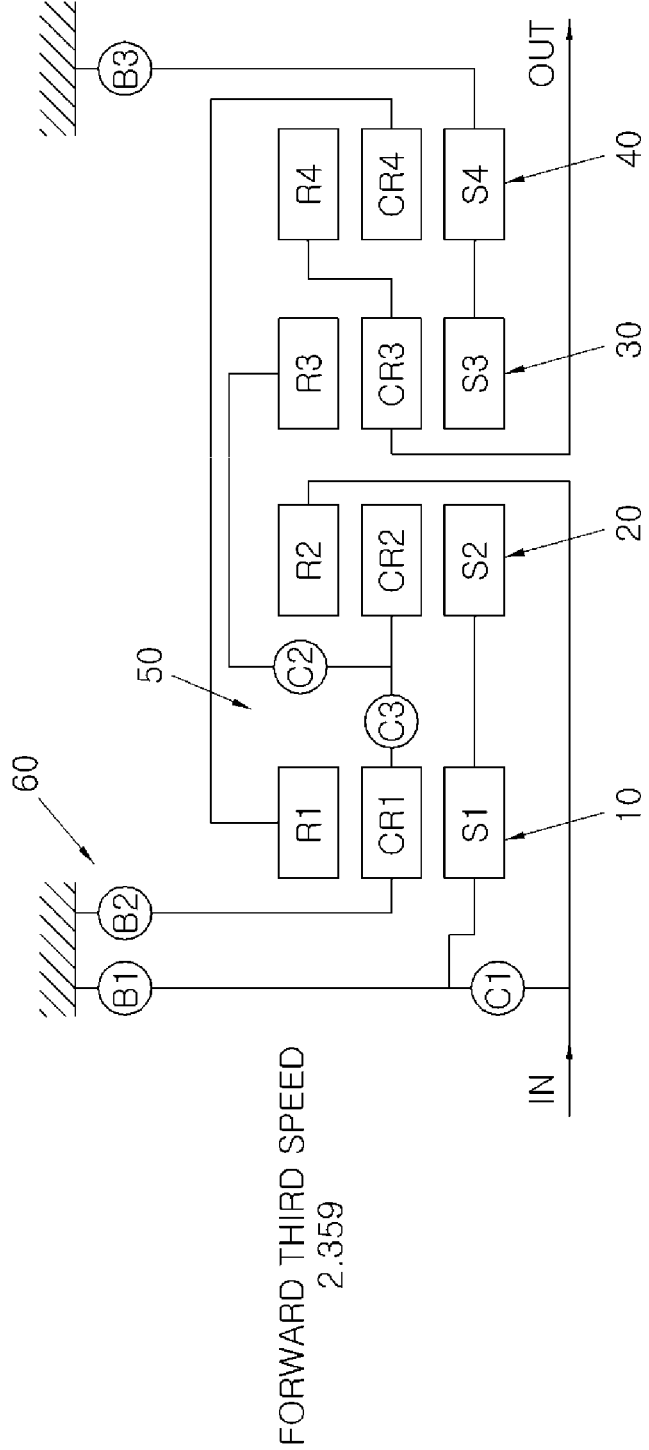
Figure 8:
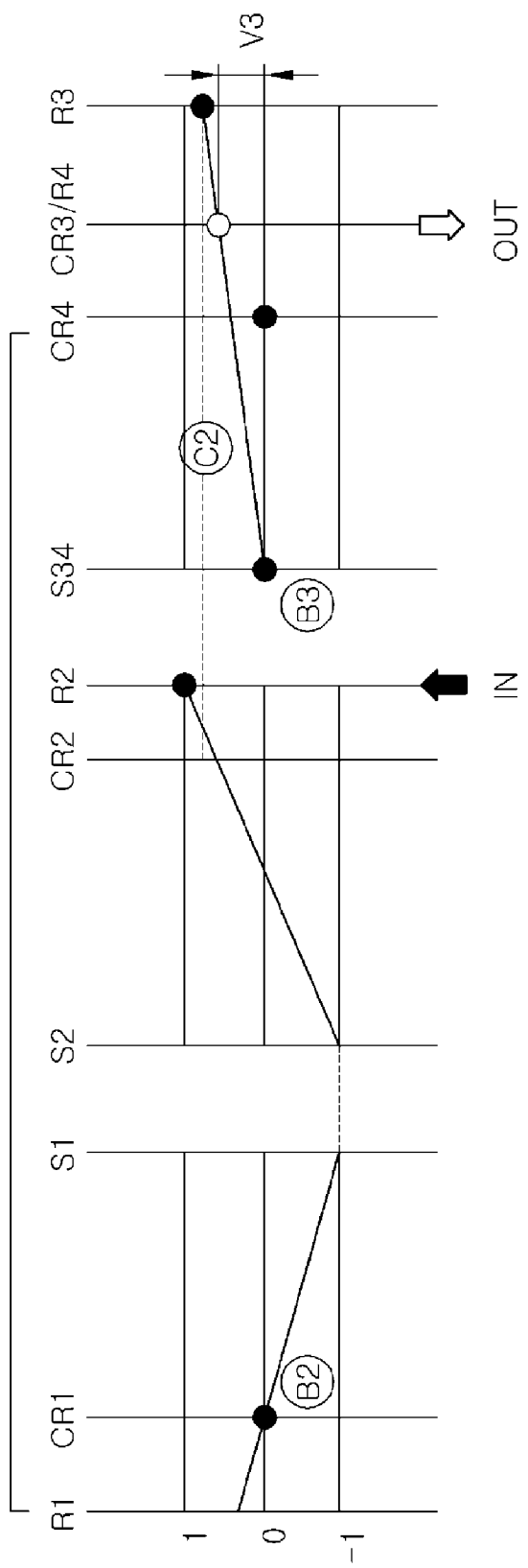

At the forward third speed of FIG. 7 and FIG. 8, the release of the first brake B1 and the operation of the third brake B3 may be performed in the state of the forward second speed, in order to control the operations of the second clutch C2 and the second and third brakes B2 and B3. Then, the release of the first brake B1 may release the first ring gear R1, and the operation of the third brake B3 may fix the third and fourth sun gears S3 and S4. Thus, as a speed line is formed by a complementary operation between the rotating elements, the third carrier/fourth ring gear CR3/R4 of the third and fourth planetary gear sets 30 and 40 may generate a forward third speed output by V3 of the horizontal upper line. The third speed output of the third carrier/fourth ring gear CR3/R4 may be transmitted to the differential gear through the output shaft OUT, and the gear shifting for the forward third speed may be completed.

Figure 9:
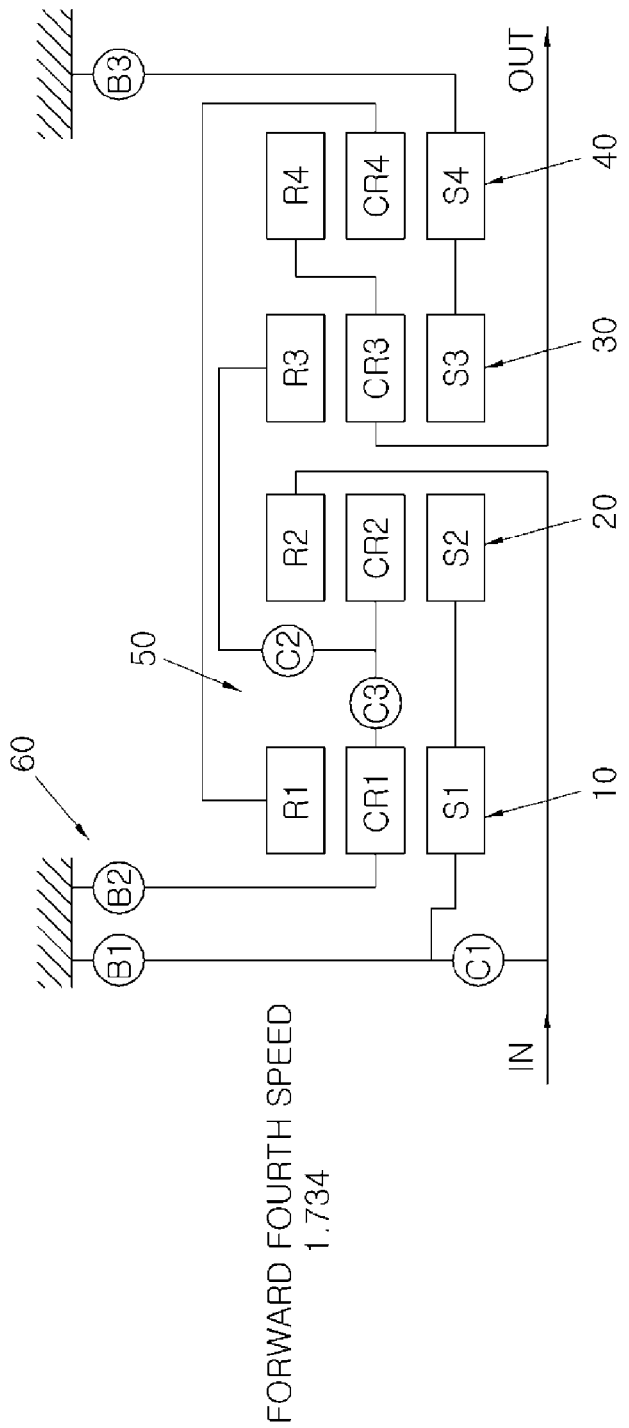
Figure 10:
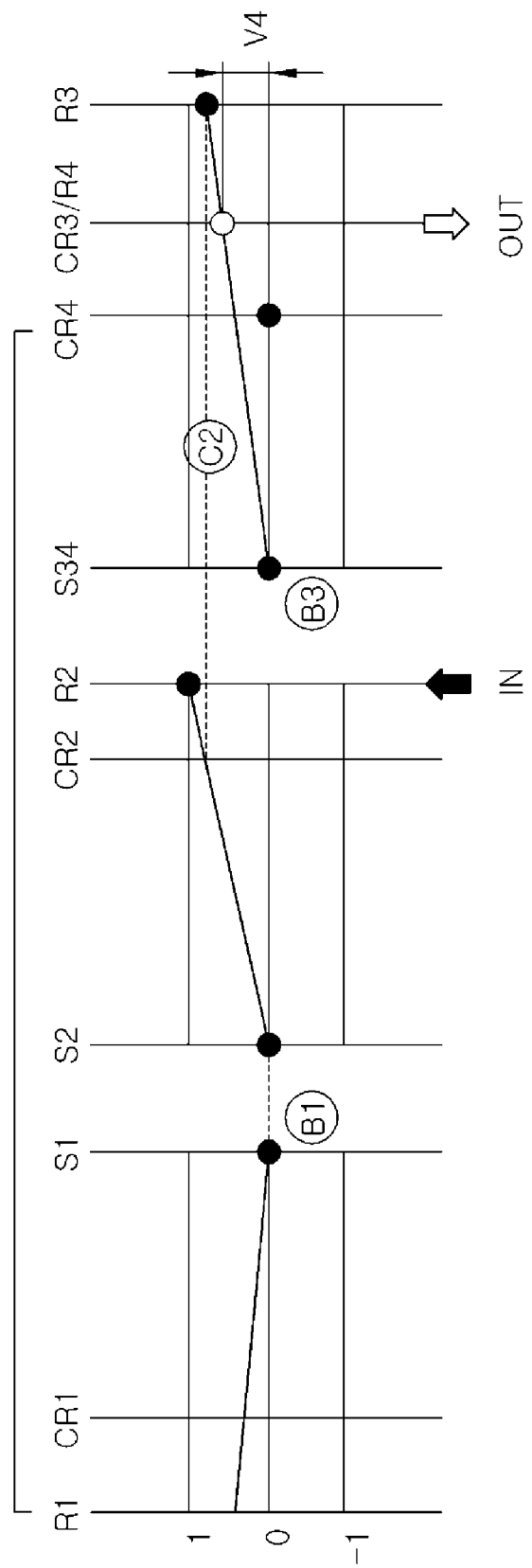

At the forward fourth speed of FIG. 9 and FIG. 10, the release of the second brake B1 and the operation of the first brake B1 may be performed in the state of the forward third speed, in order to control the operations of the second clutch C2 and the first and third brakes B1 and B3. Then, the release of the second brake B2 may release the first carrier CR1, and the operation of the first brake B1 may fix the first sun gear S1. Thus, as a speed line is formed by a complementary operation between the rotating elements, the third carrier/fourth ring gear CR3/R4 of the third and fourth planetary gear sets 30 and 40 may generate a forward fourth speed output by V4 of the horizontal upper line. The fourth speed output of the third carrier/fourth ring gear CR3/R4 may be transmitted to the differential gear through the output shaft OUT, and the gear shifting for the forward fourth speed may be completed.

Figure 11:
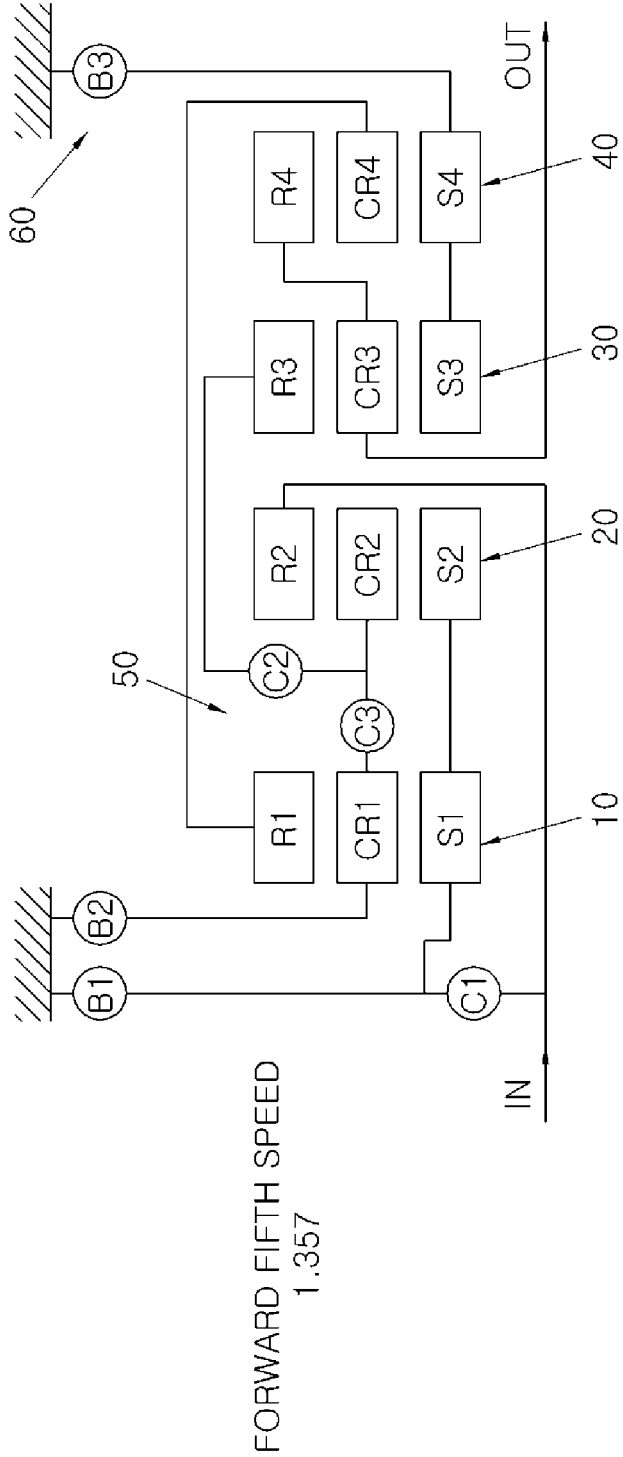
Figure 12:
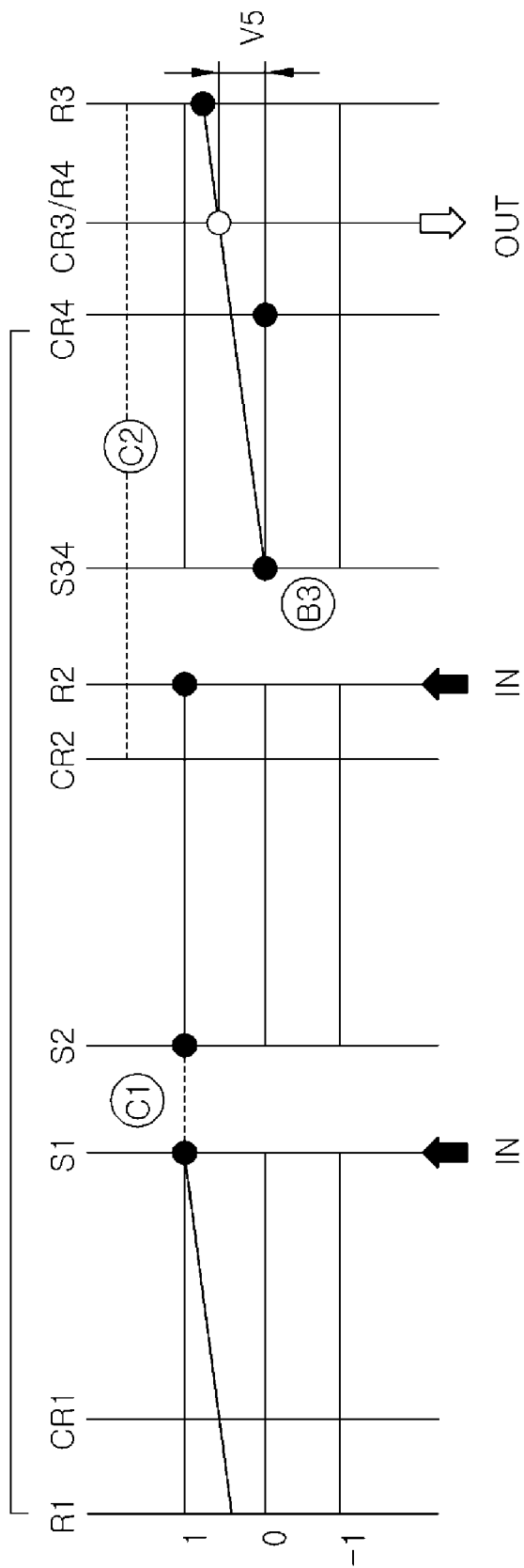

At the forward fourth speed of FIG. 11 and FIG. 12, the release of the first brake B1 and the operation of the first clutch C1 may be performed in the state of the forward fourth speed, in order to control the operations of the first and second clutches C1 and C2 and the third brake B3. Then, the release of the first brake B1 may release the first ring gear R1, and the operation of the first clutch C1 may connect the input shaft IN to the first sun gear S1. Thus, as a speed line is formed by a complementary operation between the rotating elements, the third carrier/fourth ring gear CR3/R4 of the third and fourth planetary gear sets 30 and 40 may generate a forward fifth speed output by V5 of the horizontal upper line. The fifth speed output of the third carrier/fourth ring gear CR3/R4 may be transmitted to the differential gear device through the output shaft OUT, and the gear shifting for the fifth forward speed may be completed.

Figure 13:
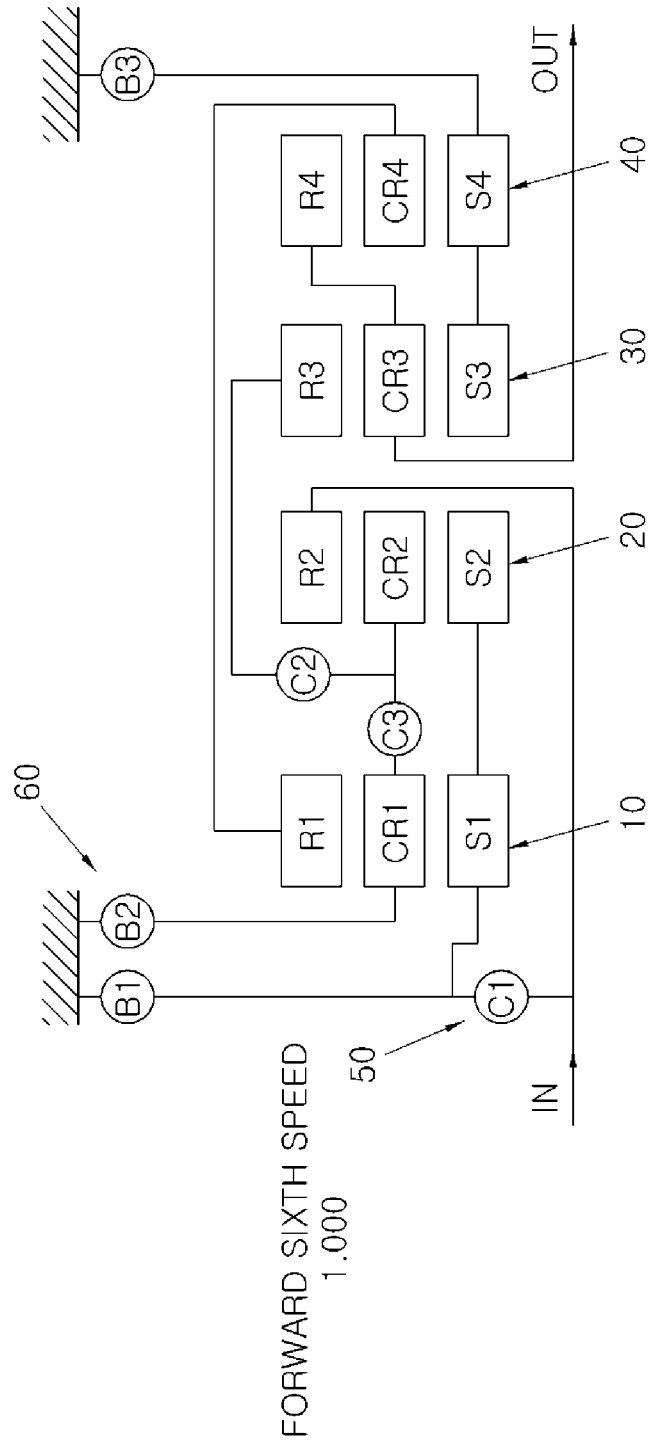
Figure 14:
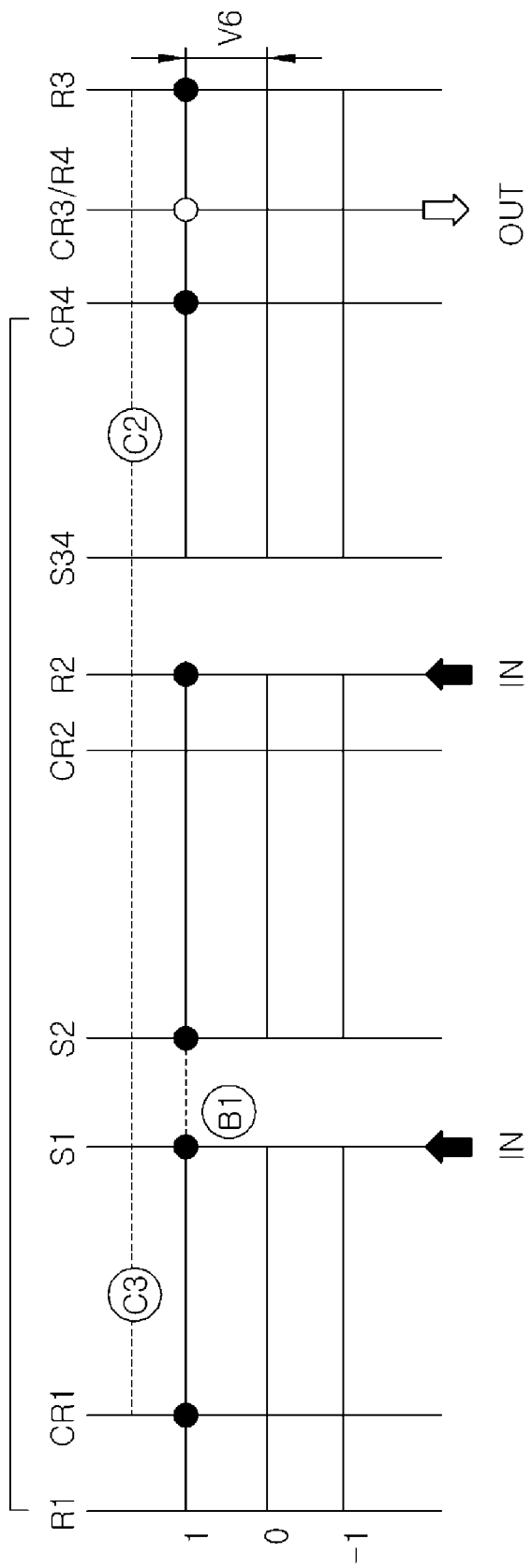

At the forward sixth speed of FIG. 13 and FIG. 14, the release of the third brake B3 and the operation of the third clutch C3 may be performed in the state of the forward fifth speed, in order to control the operations of the first to third clutches C1 to C3. Then, the release of the third brake B3 may release the third and fourth sun gears S3 and S4, and the operation of the third clutch C3 may connect the first carrier CR1 to the third ring gear R3. Thus, as a speed line is formed by a complementary operation between the rotating elements, the third carrier/fourth ring gear CR3/R4 of the third and fourth planetary gear sets 30 and 40 may generate a forward sixth speed output by V6 of the horizontal upper line. The sixth speed output of the third carrier/fourth ring gear CR3/R4 may be transmitted to the differential gear through the output shaft OUT, and the gear shifting for the forward sixth speed may be completed.

Figure 15:
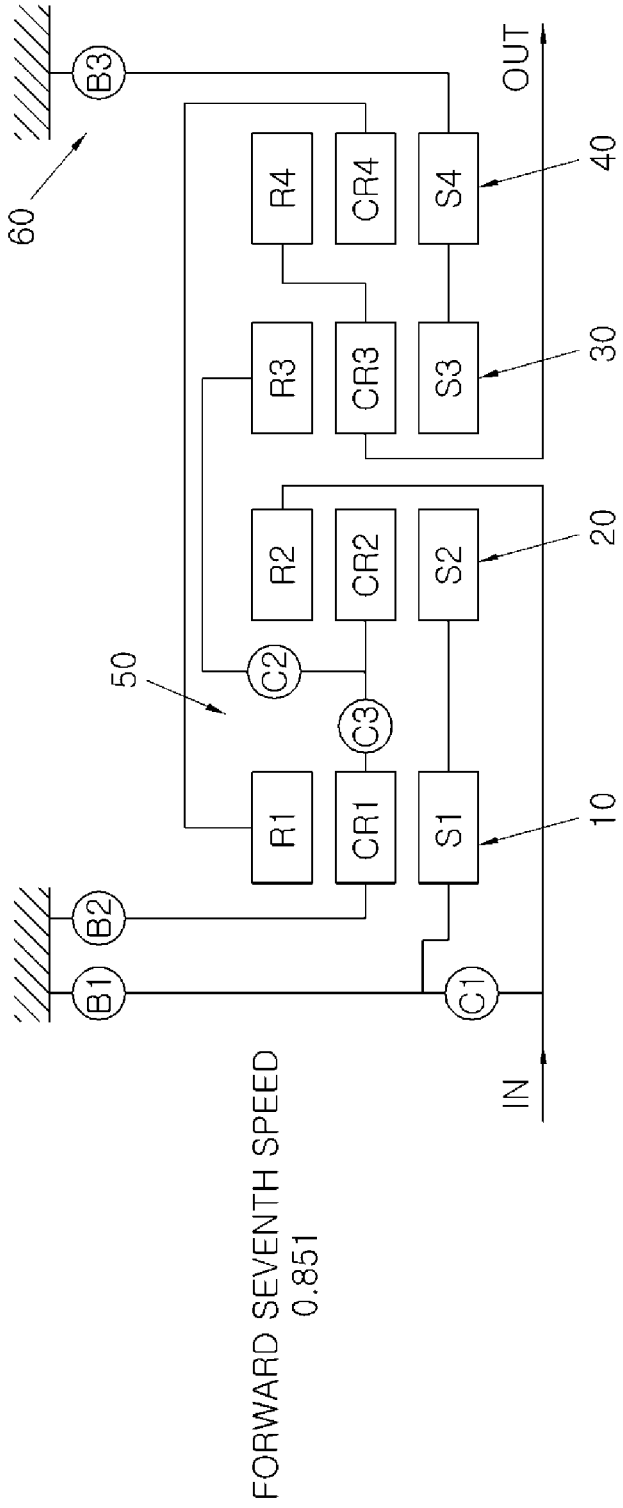
Figure 16:
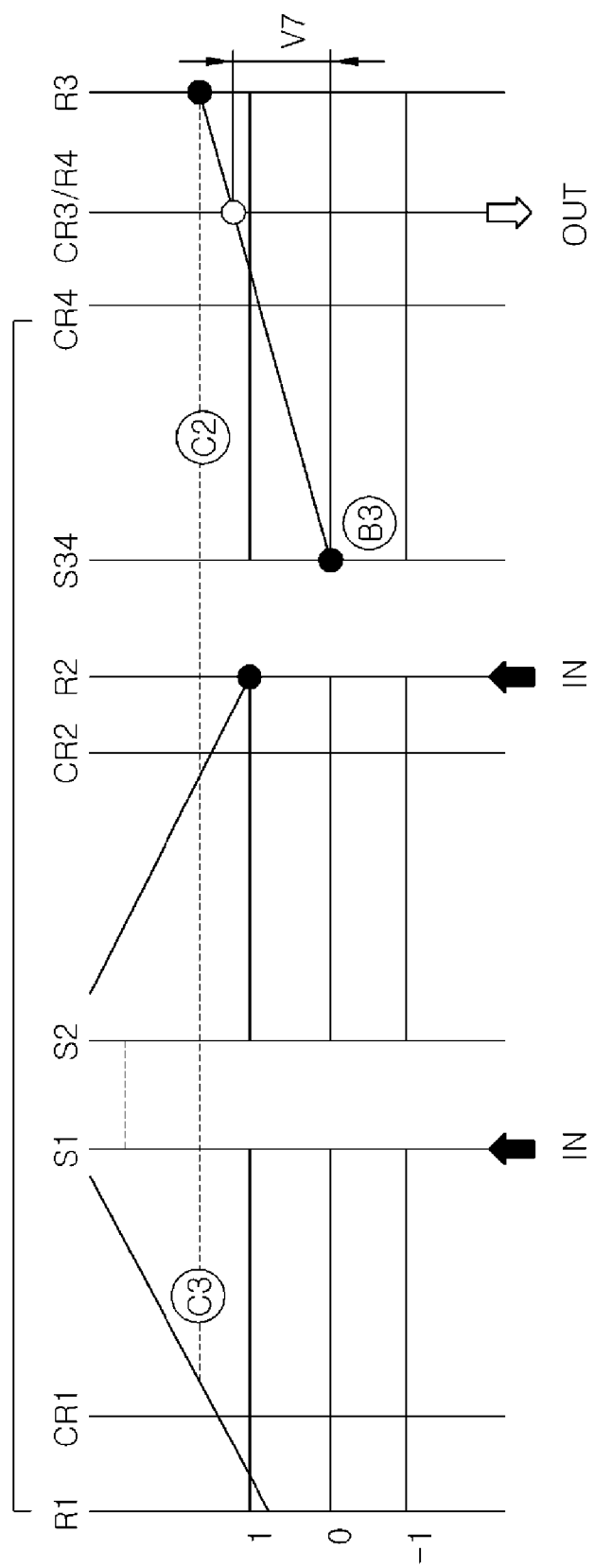

At the forward seventh speed of FIG. 15 and FIG. 16, the release of the first clutch C1 and the operation of the third brake B3 may be performed in the state of the forward sixth speed, in order to the operations of the second and third clutches C2 and C3 and third brake B3. Then, the release of the first clutch C1 may disconnect the input shaft IN from the first sun gear S1, and the operation of the third brake B3 may fix the third and fourth sun gears S3 and S4. Thus, as a speed line is formed by a complementary operation between the rotating elements, the third carrier/fourth ring gear CR3/R4 of the third and fourth planetary gear sets 30 and 40 may generate a forward seventh speed output by V7 of the horizontal upper line. The seventh speed output of the third carrier/fourth ring gear CR3/R4 may be transmitted to the differential gear through the output shaft OUT, and the gear shifting of the forward seventh speed may be completed.

Figure 17:
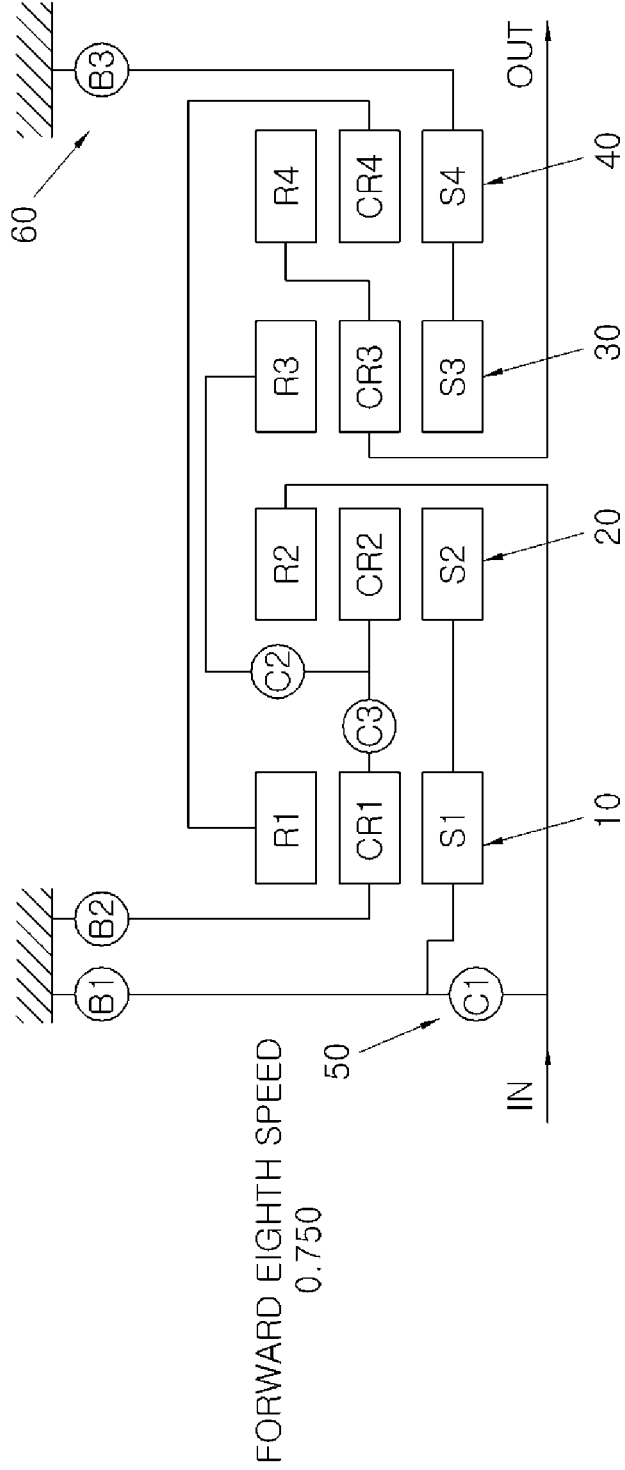
Figure 18:
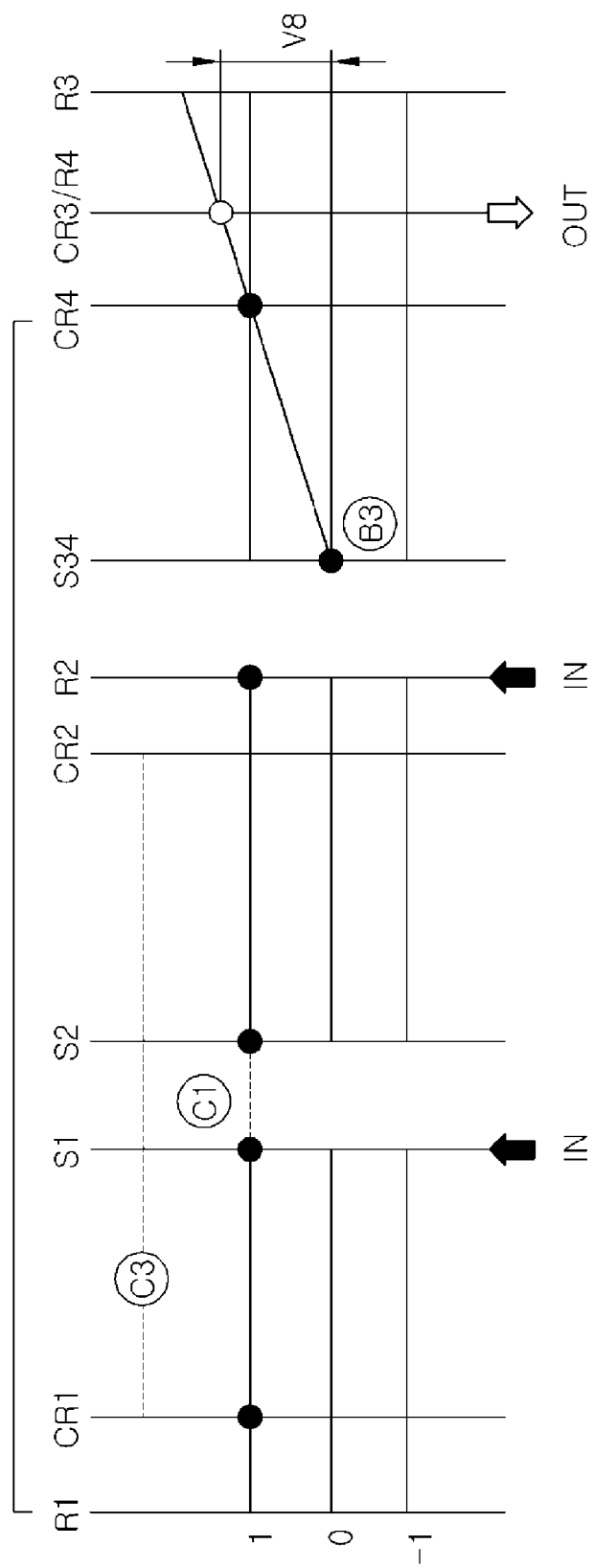

At the forward eighth speed of FIG. 17 and FIG. 18, the release of the second clutch C2 and the operation of the first clutch C1 may be performed in the state of the forward seventh speed, in order to the operations of the first and third clutches C1 and C3 and the third brake B3. Then, the release of the second clutch C2 may disconnect the second carrier CR2 from the third ring gear R3, and the operation of the first clutch C1 may connect the input shaft IN to the first sun gear S1. Thus, as a speed line is formed by a complementary operation between the rotating elements, the third carrier/fourth ring gear CR3/R4 of the third and fourth planetary gear sets 30 and 40 may generate a forward eighth speed output by V8 of the horizontal upper line. The eight speed output of the third carrier/fourth ring gear CR3/R4 may be transmitted to the differential gear through the output shaft OUT, and the gear shifting for the forward eighth speed may be completed.

Figure 19:
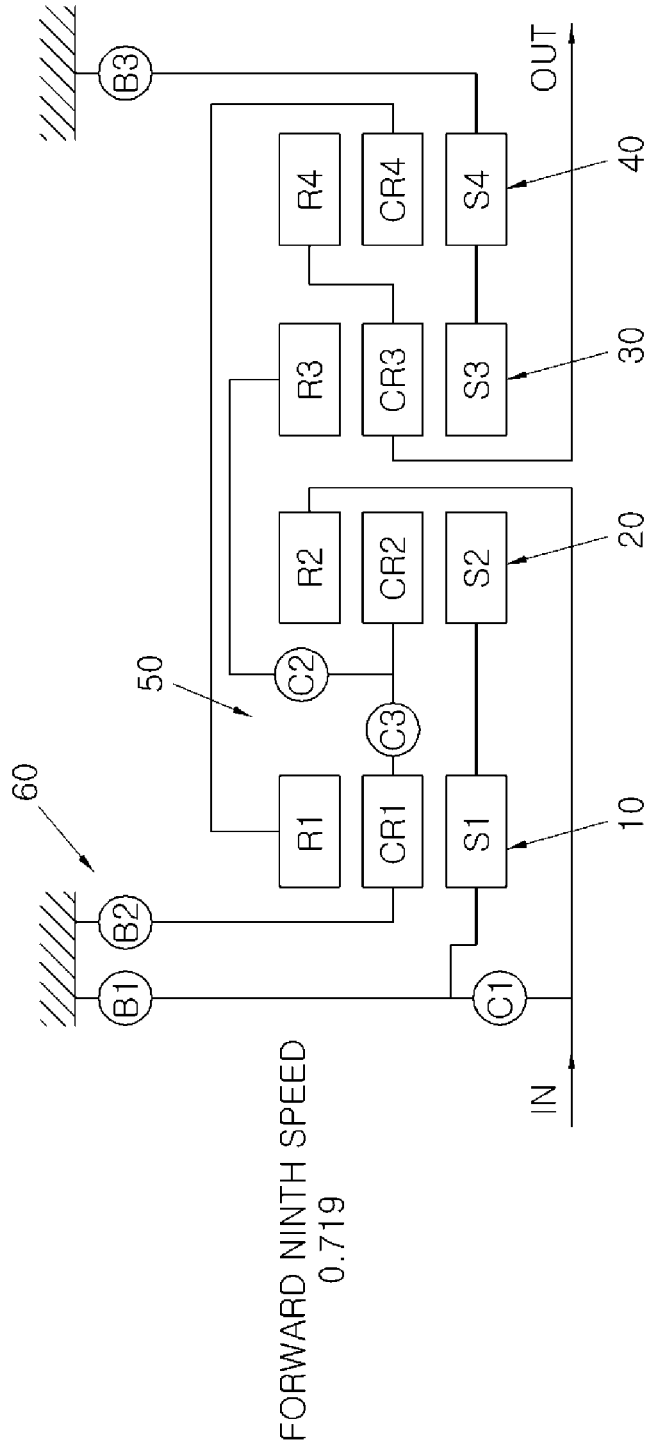
Figure 20:
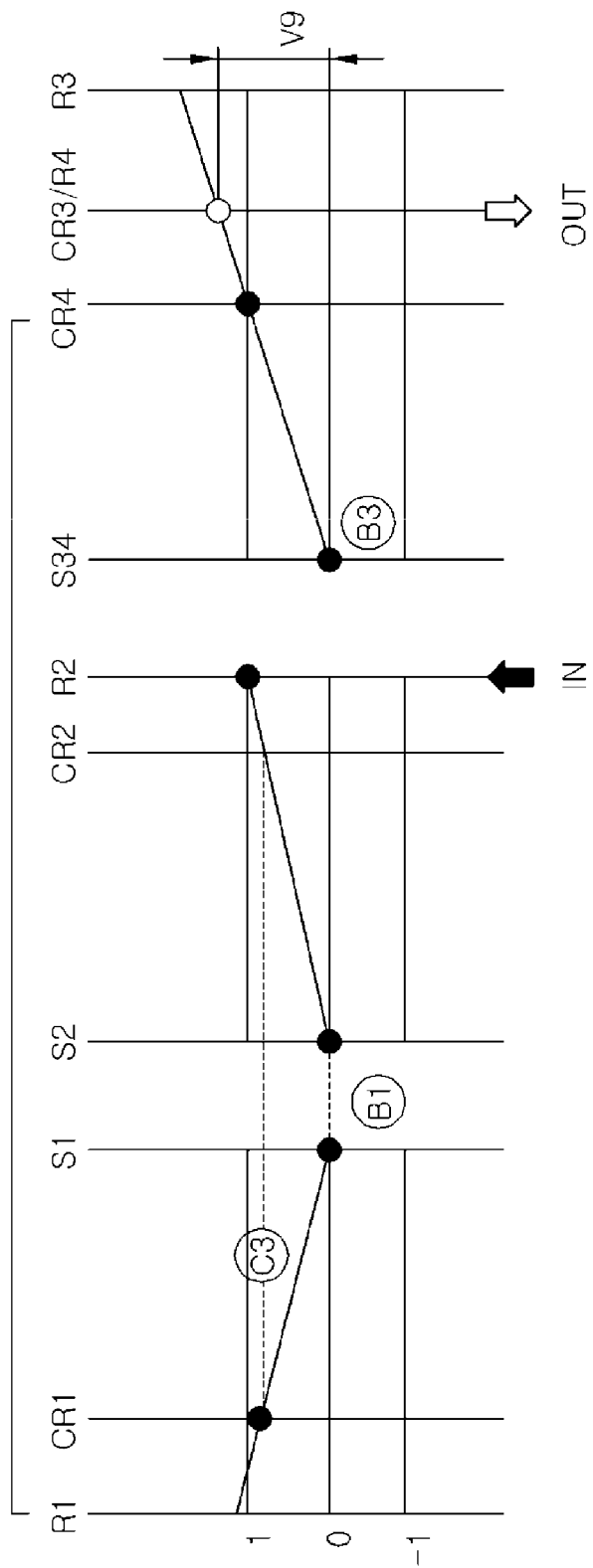

At the forward ninth speed of FIG. 19 and FIG. 20, the release of the first clutch C1 and the operation of the first brake B1 may be performed in the state of the forward eighth speed, in order to the operations of the third clutch C3 and the first and third brakes B1 and B3. Then, the release of the first clutch C1 may disconnect the input shaft IN from the first sun gear S1, and the operation of the first brake B1 may fix the first sun gear S1. Thus, as a speed line is formed by a complementary operation between the rotating elements, the third carrier/fourth ring gear CR3/R4 of the third and fourth planetary gear sets 30 and 40 may generate a forward ninth speed output by V9 of the horizontal upper line. The ninth speed output of the third carrier/fourth ring gear CR3/R4 may be transmitted to the differential gear through the output shaft OUT, and the gear shifting for the forward ninth speed may be completed.

Figure 21:
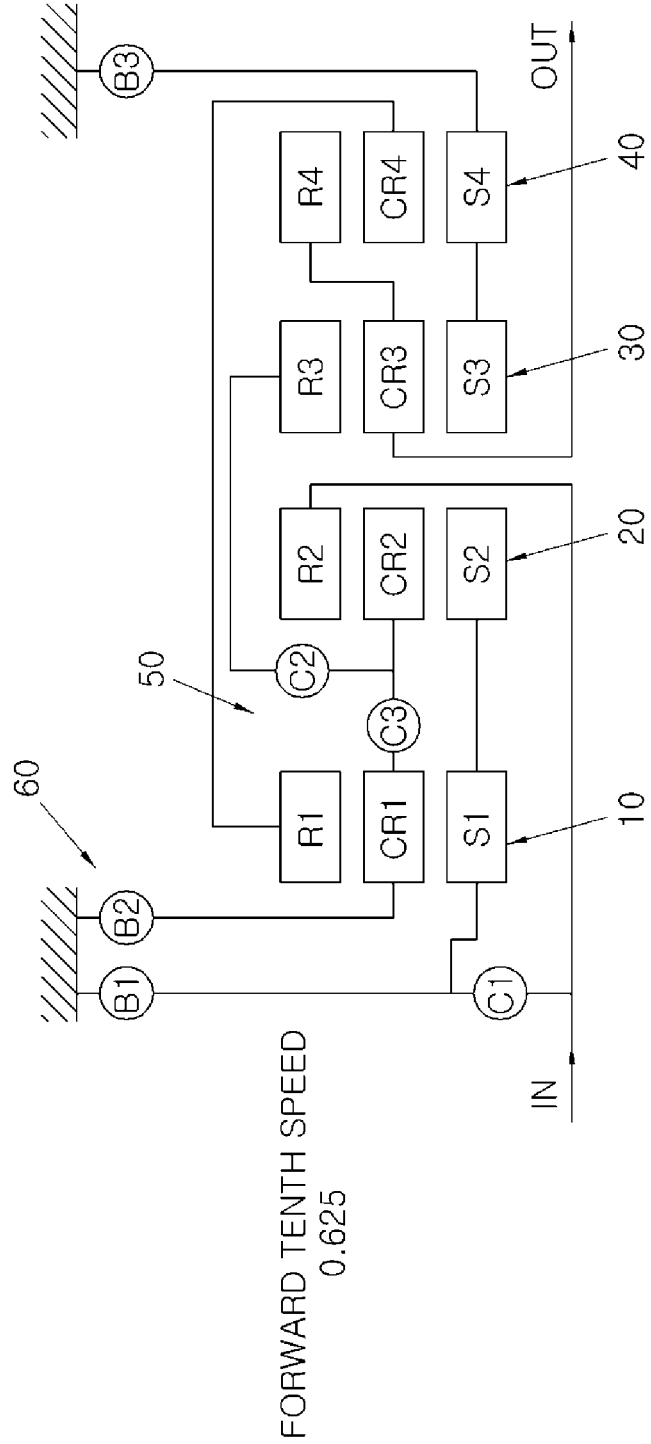
Figure 22:
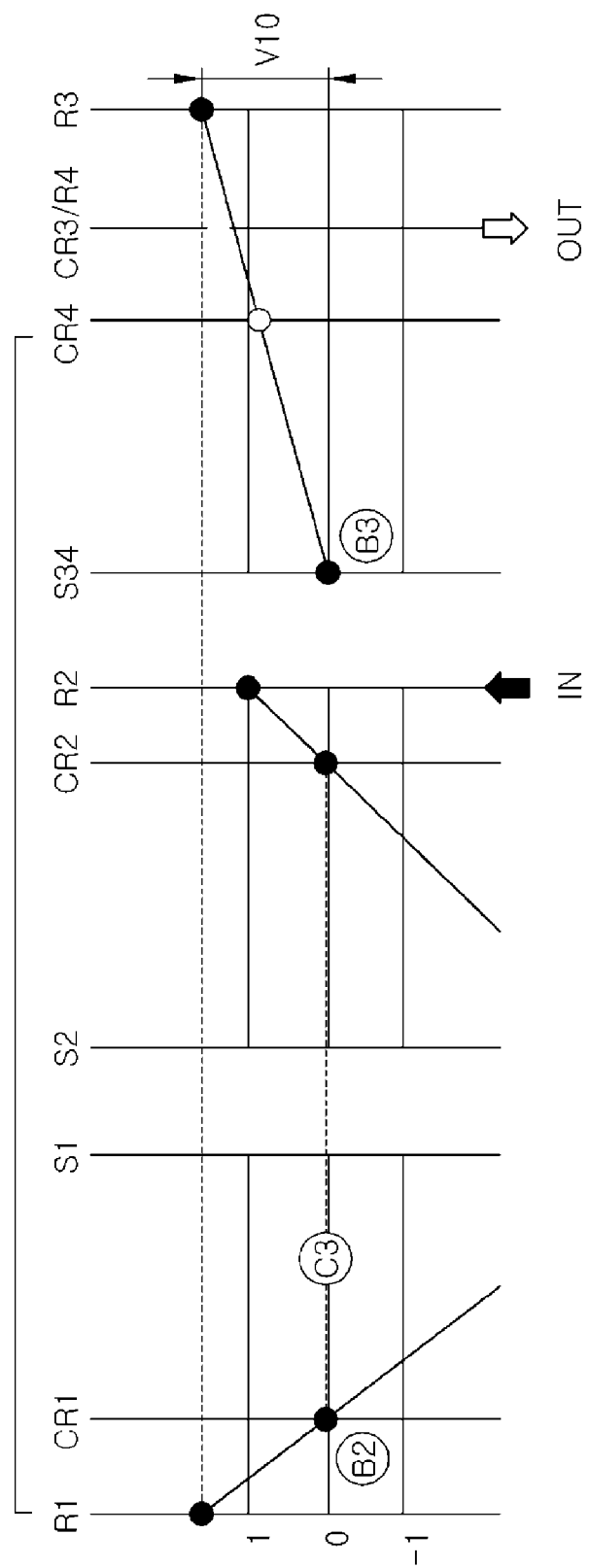

At the forward tenth speed of FIG. 21 and FIG. 22, the release of the first brake B1 and the operation of the second brake B2 may be performed in the state of the forward ninth speed, in order to the operations of the third clutch C3 and the second and third brakes B2 and B3. Then, the release of the first brake B1 may release the first ring gear R1, and the operation of the second brake B2 may fix the first carrier CR1. Thus, as a speed line is formed by a complementary operation between the rotating elements, the third carrier/fourth ring gear CR3/R4 of the third and fourth planetary gear sets 30 and 40 may generate a forward tenth speed output by V10 of the horizontal upper line. The tenth speed output of the third carrier/fourth ring gear CR3/R4 may be transmitted to the differential gear through the output shaft OUT, and the gear shifting for the forward tenth speed may be completed.

Figure 23:
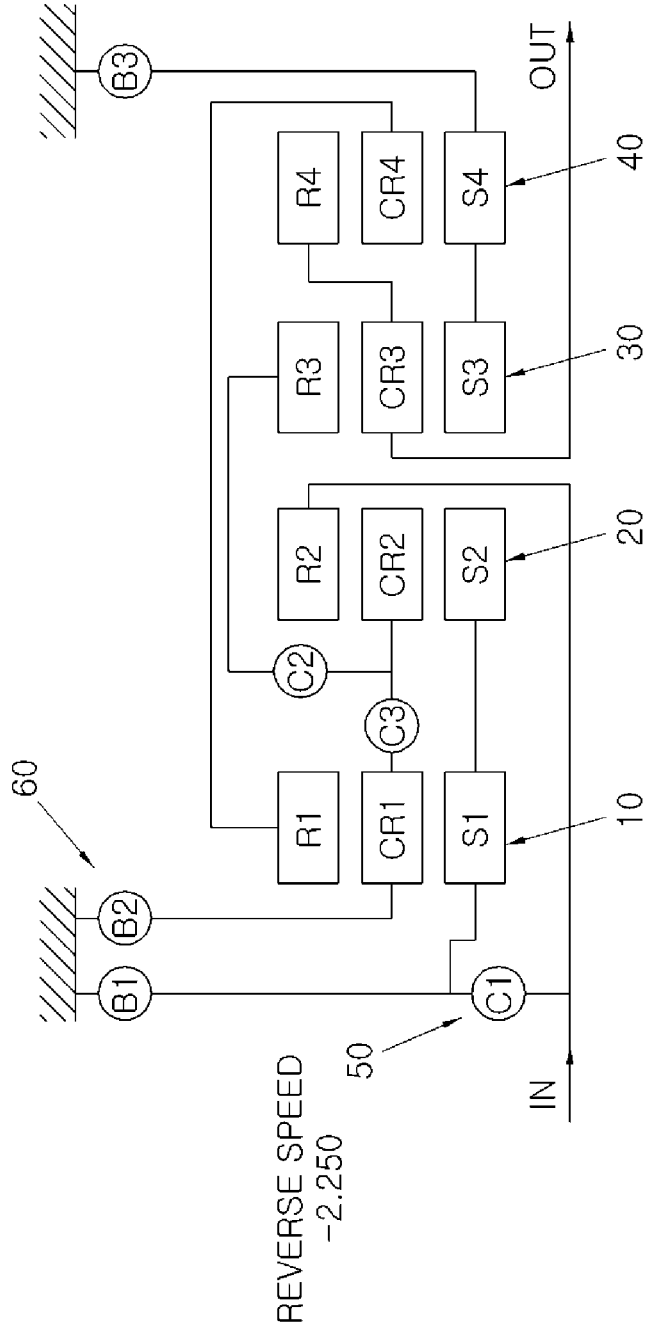
FIG. 23 and FIG. 24 illustrate a gear shift pattern for a reverse speed of a gear train of an exemplary multi-stage auto transmission for a vehicle in accordance with the present invention.
Figure 24:
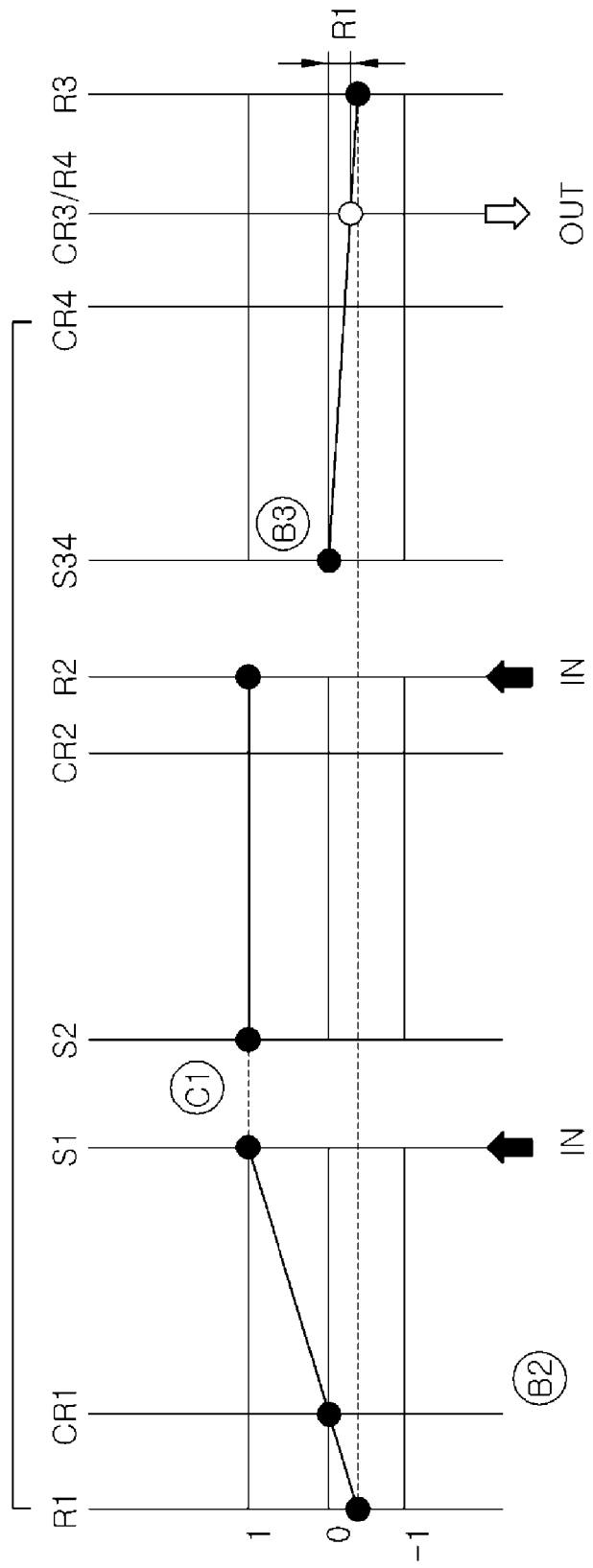

At the reverse speed of FIG. 23 and FIG. 24, the operations of the first clutch C1 and the second and third brakes B2 and B3 may be controlled. Then, the release of the first clutch C1 may connect the input shaft IN to the first sun gear S1, and the operation of the third brake B3 may fix the third and fourth sun gears S3 and S4. Thus, the input of the input shaft IN may be transmitted to the first sun gear S1 and the second ring gear R2 of the first and second planetary gear sets 10 and 20. Then, as a speed line is formed by a complementary operation between the rotating elements, the third carrier/fourth ring gear CR3/R4 of the third and fourth planetary gear sets 30 and 40 may generate a reverse speed output by R1 of the horizontal lower line. The reverse speed output of the third carrier/fourth ring gear CR3/R4 may be transmitted to the differential gear through the output shaft OUT, and the gear shifting for the reverse speed may be completed.

Figure 25:
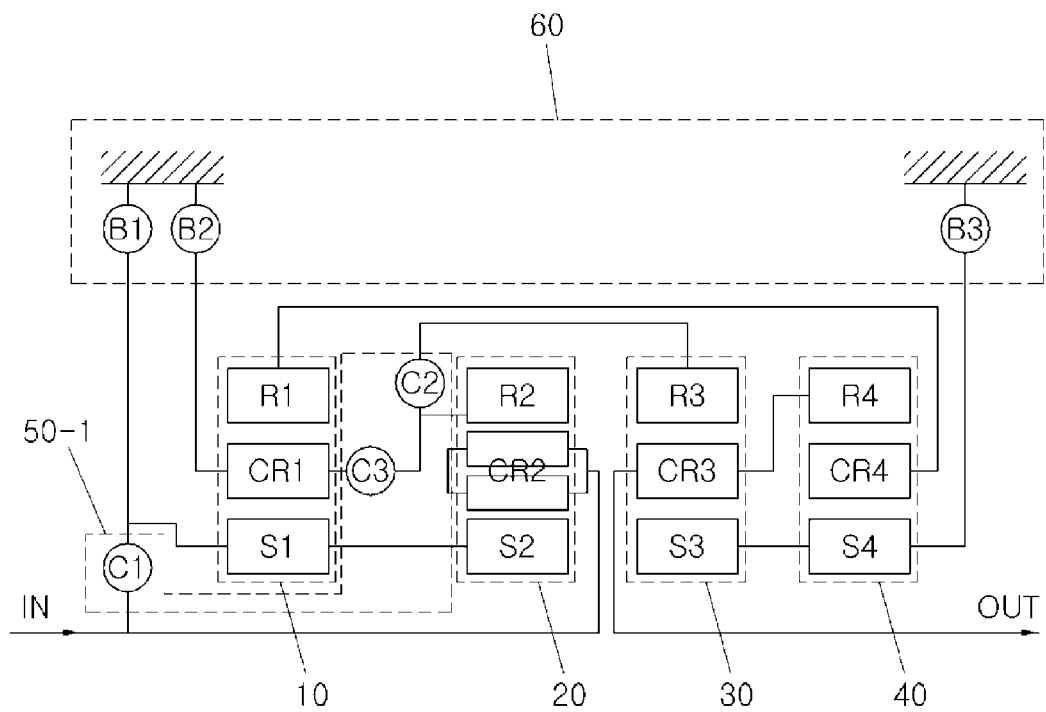
FIG. 25 illustrates a modification of a gear train of an exemplary multi-stage auto transmission for a vehicle in accordance with the present invention.

FIG. 25 illustrates a modification of the gear train in accordance with various embodiments of the present invention. As illustrated in FIG. 25, the gear train may include four planetary gear sets 10, 20, 30 and 40 arranged on the same axial line and six friction members including first to third clutches C1 to C3 and first to third brakes B1 to B3. That is, the gear train may include the same components as those of the gear train described with reference to FIGS. 1 to 24. However, the gear train of FIG. 25 is different from the gear train described with reference to FIGS. 1 to 24, in that connections of the input shaft IN for the rotating elements are changed and the first to third clutches C1 to C3 are implemented as a modified clutch set 50-1 having a different arrangement from the clutch set 50 described with reference to FIGS. 1 to 24.

Specifically, the input shaft IN may be connected to the second carrier CR2 serving as the second rotating element of the second planetary gear set 20, the second clutch C2 may be connected to the second ring gear R2 serving as the third rotating element of the second planetary gear set 20, and the third clutch C3 may be connected to the first carrier CR1 serving as the second rotating element of the first planetary gear set 10 and connected to the second clutch C2. Thus, during the gear shift for the forward first to tenth speeds and the reverse speed, the input of the input shaft IN described with reference to FIGS. 3 to 24 may be connected to the second carrier CR2 instead of the second ring gear R2 of the second planetary gear set 20.

As described above, the multi-stage auto transmission for a vehicle in accordance with various embodiments of the present invention may include the gear train which includes the four planetary gears 10, 20, 30 and 40 and the six friction members including the first to third clutches C1 to C3 and the first to third brakes B1 to B3. The ten forward speeds and one reverse may be implemented in various manners through various arrangements of the first to third clutches C1 to C3 with respect to the rotating elements.

In the multi-stage auto transmission in accordance with the exemplary embodiments of the present invention, the gear train capable of implementing ten forward speeds and one reverse speed may include the same components as those of the gear train included in the nine-forward and one-reverse auto transmission. Thus, the structure of the gear train may be optimized.

Furthermore, the multi-stage auto transmission may improve fuel efficiency based on the ten forward speeds through the optimized gear train structure, and contribute to the smooth operation of the vehicle because an operation point in a low RPM range is used.

Furthermore, according to the tendency in which more and more seven or more-speed auto transmissions are mounted, it is possible to rapidly deal with the multi-stage auto transmission market.

For convenience in explanation and accurate definition in the appended claims, the terms "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A multi-stage auto transmission for a vehicle, comprising:
   first, second, third and fourth planetary gear sets, wherein each of the first, second, third, and fourth planetary gear sets includes first, second and third rotating elements;
   friction members comprising first, second and third clutches and first, second and third brakes;
   an input shaft to which rotation power is inputted; and
   an output shaft from which the rotation power is outputted, wherein
   the first rotating element of the first planetary gear set is selectively connected to the input shaft through the first clutch and continuously connected to the first rotating element of the second planetary gear set wherein the first rotating element of the first planetary gear set is connected to the first brake, the second rotating element of the first planetary gear set is selectively connected to the second rotating element of the second planetary gear set through the third clutch wherein the second rotating element of the first planetary gear set is connected to the second brake, and the third rotating element of the first planetary gear set is continuously connected to the second rotating element of the fourth planetary gear set, the first rotating element of the second planetary gear set is continuously connected to the first rotating element of the first planetary gear set, the second rotating element of the second planetary gear set is selectively connected to the third rotating element of the third planetary gear set through the second clutch, and the third rotating element of the second planetary gear set is continuously connected to the input shaft, the first rotating element of the third planetary gear set is continuously connected to the first rotating element of the fourth planetary gear set and connected to the third brake, the second rotating element of the third planetary gear set is continuously connected to the third rotating element of the fourth planetary gear set and continuously connected to the output shaft, and the third rotating element of the third planetary gear set is selectively connected to the second rotating element of the second planetary gear set through the second clutch, and the first rotating element of the fourth planetary gear set is continuously connected to the first rotating element of the third planetary gear set and connected to the third brake, the second rotating element of the fourth planetary gear set is continuously connected to the third rotating element of the first planetary gear set, and the third rotating element of the fourth planetary gear set is continuously connected to the second rotating element of the third planetary gear set.

2. The multi-stage auto transmission of claim 1, wherein the input shaft is selectively connected to the first rotating element of the first planetary gear set through the first clutch, and directly connected to the third rotating element of the second planetary gear set, and the output shaft is connected to the third rotating element of the fourth planetary gear set and the second rotating element of the third planetary gear set.

3. The multi-stage auto transmission of claim 1, wherein
in the first planetary gear set, the first rotating element is a first sun gear, the second rotating element is a first carrier, and the third rotating element is a first ring gear,
in the second planetary gear set, the first rotating element is a second sun gear, the second rotating element is a second carrier, and the third rotating element is a second ring gear,
in the third planetary gear set, the first rotating element is a third sun gear, the second rotating element is a third carrier, and the third rotating element is a third ring gear, and
in the fourth planetary gear set, the first rotating element is a fourth sun gear, the second rotating element is a fourth carrier, and the third rotating element is a fourth ring gear.

4. A multi-stage auto transmission for a vehicle, comprising:
a first planetary gear set comprising first, second and third rotating elements and having a first clutch and first and second brakes arranged at a side thereof;
a second planetary gear set comprising first, second and third rotating elements and having second and third clutches arranged at a side thereof;
a third planetary gear set comprising first, second and third rotating elements;

a fourth planetary gear set comprising first, second and third rotating elements and having a third brake arranged at a side thereof;
an input shaft selectively connected to the first rotating element of the first planetary gear set through the first clutch, and directly connected to the second rotating element of the second planetary gear set; and
an output shaft continuously connected to the third rotating element of the fourth planetary gear set and the second rotating element of the third planetary gear set.

5. The multi-stage auto transmission of claim 4, wherein
in the first planetary gear set, the first rotating element is a first sun gear, the second rotating element is a first carrier, and the third rotating element is a first ring gear,
in the second planetary gear set, the first rotating element is a second sun gear, the second rotating element is a second carrier, and the third rotating element is a second ring gear,
in the third planetary gear set, the first rotating element is a third sun gear, the second rotating element is a third carrier, and the third rotating element is a third ring gear, and
in the fourth planetary gear set, the first rotating element is a fourth sun gear, the second rotating element is a fourth carrier, and the third rotating element is a fourth ring gear.

6. The multi-stage auto transmission of claim 5, wherein among the first sun gear, the first carrier, and the first ring gear of the first planetary gear set, the first sun gear is selectively connected to the input shaft through the first clutch and continuously connected to the second sun gear of the second planetary gear set wherein the first sun gear is connected to the first brake, the first carrier is selectively connected to the second ring gear of the second planetary gear set through the third clutch wherein the first carrier is connected to the second brake, and the first ring gear is continuously connected to the fourth carrier of the fourth planetary gear set.

7. The multi-stage auto transmission of claim 5, wherein among the second sun gear, the second carrier, and the second ring gear of the second planetary gear set, the second sun gear is continuously connected to the first sun gear of the first planetary gear set, the second carrier is continuously connected to the input shaft, and the second ring gear is selectively connected to the third ring gear of the third planetary gear set through the second clutch.

8. The multi-stage auto transmission of claim 5, wherein among the third sun gear, the third carrier, and the third ring gear of the third planetary gear set, the third sun gear is continuously connected to the fourth sun gear of the fourth planetary gear set and connected to the third brake, the third carrier is continuously connected to the fourth ring gear of the fourth planetary gear set and continuously connected to the output shaft, and the third ring gear is selectively connected to the second ring gear of the second planetary gear set through the second clutch.

9. The multi-stage auto transmission of claim 5, wherein among the fourth sun gear, the fourth carrier, and the fourth ring gear of the fourth planetary gear set, the fourth sun gear is continuously connected to the third sun gear of the third planetary gear set and connected to the third brake, the fourth carrier is continuously connected to the first ring gear of the first planetary gear set, and the fourth ring gear is continuously connected to the third carrier of the third planetary gear set.

* * * * *